(12) United States Patent
Shim et al.

(10) Patent No.: US 7,584,506 B2
(45) Date of Patent: Sep. 1, 2009

(54) METHOD AND APPARATUS FOR CONTROLLING PACKET TRANSMISSION AND GENERATING PACKET BILLING DATA ON WIRED AND WIRELESS NETWORK

(75) Inventors: Jae-Hee Shim, Seoul (KR); Gun-Woo Yu, Seoul (KR); Sang-Hee Kim, Guri-si (KR)

(73) Assignee: NTELS Co., Ltd., Seoul (KR)

( * ) Notice: Subject to any disclaimer, the term of this patent is extended or adjusted under 35 U.S.C. 154(b) by 911 days.

(21) Appl. No.: 10/865,074

(22) Filed: Jun. 10, 2004

(65) Prior Publication Data

US 2004/0252692 A1  Dec. 16, 2004

(30) Foreign Application Priority Data

Jun. 11, 2003   (KR) ...................... 10-2003-0037549

(51) Int. Cl.
*G06F 11/00* (2006.01)
(52) U.S. Cl. .............................. 726/22; 726/13; 726/14; 726/25; 370/392; 370/428; 705/55; 719/312; 709/230; 709/231
(58) Field of Classification Search .................. 726/22, 726/13, 25, 11, 12, 14; 370/392, 395.5, 401, 370/428; 709/224, 230, 231, 232; 705/52, 705/77; 719/312
See application file for complete search history.

(56) References Cited

U.S. PATENT DOCUMENTS

| | | | |
|---|---|---|---|
| 5,920,705 A * | 7/1999 | Lyon et al. .................. 709/240 |
| 6,424,621 B1 * | 7/2002 | Ramaswamy et al. ........ 370/230 |
| 6,470,398 B1 * | 10/2002 | Zargham et al. ............. 719/318 |
| 6,546,423 B1 * | 4/2003 | Dutta et al. .................. 709/225 |
| 6,606,710 B2 * | 8/2003 | Krishnan et al. .............. 726/13 |
| 6,728,885 B1 * | 4/2004 | Taylor et al. ................... 726/24 |
| 7,032,031 B2 * | 4/2006 | Jungck et al. ............... 709/246 |
| 7,065,571 B2 * | 6/2006 | Schweitzer et al. ......... 709/223 |
| 7,107,348 B2 * | 9/2006 | Shimada et al. ............. 709/229 |
| 7,117,501 B2 * | 10/2006 | Rosu et al. .................. 719/310 |
| 7,254,562 B2 * | 8/2007 | Hsu et al. ...................... 705/77 |
| 2004/0010473 A1 * | 1/2004 | Hsu et al. ...................... 705/77 |
| 2004/0250127 A1 * | 12/2004 | Scoredos et al. ............ 713/201 |

FOREIGN PATENT DOCUMENTS

KR   2002-87205   6/2005

* cited by examiner

*Primary Examiner*—David García Cervetti
*Assistant Examiner*—Shanto M Abedin
(74) *Attorney, Agent, or Firm*—Knobbe Martens Olson & Bear LLP

(57) ABSTRACT

Inventive embodiments relate to a method and apparatus for packet transmission control and packet charge data generation on wired/wireless network, especially, the apparatus can control the packet transmission and measure the amount of packet. The apparatus receives a packet data through a network and stores the packet data in a shared memory. After determining whether the packet data satisfies with a filtering rule, it deletes the packet data if the packet data satisfies with the filtering rule and transmits the packet data to destination otherwise. Then, it generates preliminary billing data corresponding to the packet data and transmits the preliminary billing data to a billing apparatus.

13 Claims, 13 Drawing Sheets

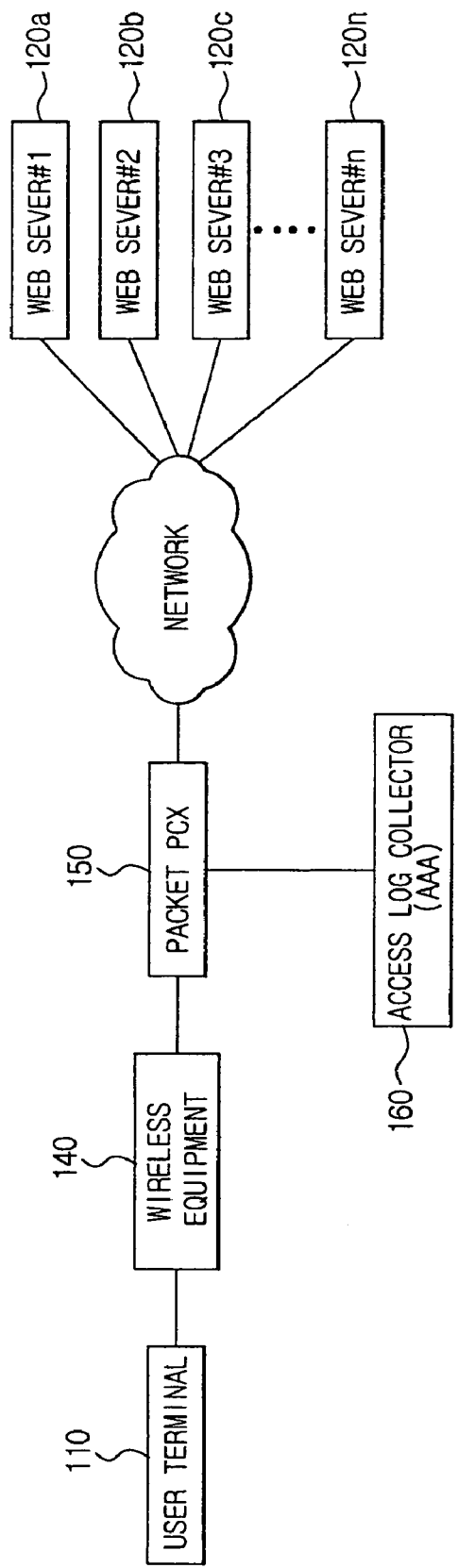

METHOD AND APPARATUS FOR CONTROLLING PACKET TRANSMISSION AND GENERATING PACKET BILLING DATA ON WIRED AND WIRELESS NETWORK

RELATED APPLICATIONS

This application is based on, and claims priority from Korea Application No. 10-2003-0037549 filed on Jun. 11, 2003, in Korean, the disclosure of which is hereby incorporated by reference herein in its entirety.

BACKGROUND OF THE INVENTION

1. Filed of the Invention

The present invention relates to a method and apparatus for packet transmission control and packet billing data generation on wired/wireless network, especially, the apparatus can control the packet transmission and measure the amount of packet.

2. Description of the Related Technology

The development of science and technology and the improvement of economy make it possible to develop communication devices and distribute these kinds of devices widely. Also, the distribution of communication devices enables users on remote sites to communicate data via wired/wireless network.

FIG. 1A is a schematic diagram showing the conventional billing method in wired Internet environment.

Referring to FIG. 1A, user terminal 110 and more than one web server 120a, 120b, 120c, ... 120n (hereinafter, these are called collectively as "120") are connected to each other via network.

User terminal 110 can be any device such as mobile terminal, PDA(Personal Digital Assistant), notebook computer, which can access to web server 120.

As shown in FIG. 1A, if an user wants to use any chargeable contents provided from the web sever 120 in the wired Internet environment, the user has to access to the web server 120.

And then, if the user used chargeable contents of the web server 120, the web server 120 records and manages the chargeable content use data of the user to the user access log.

When the communication service provider(namely, wired Internet access service provider) starts a billing process at the predetermined time, the access log collector 130 collects the user access log from more than one web server 120 on the network.

In this case, if the format of user access log in one web server is different from that of another web server, these formats are converted into a standard format and then the billing for used chargeable contents is performed.

But, since the access log collector has to be connected to many web servers if many web servers 120 exist on the network and each access method can be different from each other, it is a problem that the conventional billing method has to equip various interfaces for each web server 120.

FIG. 1B is a schematic diagram showing the conventional billing method in wireless Internet environment.

Referring to FIG. 1B, a user terminal capable for using the wireless Internet service 110 and more than one web servers 120 are connected to each other via network.

If a user wants to use wireless Internet service, the user terminal 110 has to access to a packet PCX 150 through a wireless equipment 140. The packet PCX 150, which converts data packet in wireless network into Internet packet in wired Internet, is one chosen from GGSN(Gateway GPRS Support Node) and SGSN(Serving GSM Support Node) in WCDMA and AP(Access Point) in wireless LAN.

Also, when the packet PCX 150 converts data packet in wireless network into Internet packet in wired Internet to make the user terminal to access to the web server 120, the amount of packet usage of each user is sent periodically to the billing log collector(i.e., AAA) 160.

When billing the wireless data communication, the communication service provider performs the billing process by use of the amount of packet usage of each user, collected by the billing log collector 160. However, this billing system is only suitable for simple billing scheme proportional to packet usage, not for various billing schemes for each service.

Sometimes the user has to pay for the data communication (i.e., receiving chargeable data) through wired/wireless network and the service provider has to collect and manage data on the usage amount of each user in order to charge for the data communication. Since some malicious users conduct hacking or DoS(Denial of Service) attacks to disrupt networked communication services, an access to a web server and the like, the protection scheme(i.e., packet service control) against these kinds of attacks is being required.

Most of existing packet service control methods, which were applied to the conventional network, use a firewall that compares a source IP address and a destination IP address in order to determine the transmission of packet. And as a method of measuring the amount of user data packet, used content record(that is, user access log) stored in the web server where the user accessed is applied to wired Internet to generate billing data, and total amount of packets is applied to wireless Internet.

However, the conventional packet service control method compares only source IP address and destination IP address in the firewall to determine the transmission of packet so that the conventional method cannot provide a proper solution against the hacking attacks like DOS because it is impossible to compare only by IP addresses. Further, the conventional method cannot provide any solution even when the method has to determine the packet transmission based on the application protocol, the highest level of TCP/IP protocol.

And, in the conventional billing data generating(that is, usage amount measuring) method, the web server records the usage log of each user and then sends the usage log to an external billing server that uses the usage log as basic billing data. But since the external billing server has to cooperatively process with a new web server whenever a new web server comes, there is a problem to perform the billing process quickly and flexibly.

Also, in the case of the conventional billing data generating method in the wireless Internet, the external billing server performs the billing process on receiving from PCX the total amount of packets that the user used after accessing to the network. But since data provided to the billing server is limited to the total amount of packets in this kind of method, it is impossible to apply different fee schedules for different types of services.

Also, although the conventional packet service control function and billing data generating function are essential to the communication service provider, they have to buy independent devices because there is no device providing the above-mentioned functions. It causes the double expenses and the complicated management.

SUMMARY OF CERTAIN INVENTIVE ASPECTS OF THE INVENTION

One aspect of the invention provides a method and device of packet transmission control and billing data generating on wired/wireless network, which have a hacking detection function for detecting a hacking such as DOS attacks through a packet access control by analyzing a data packet at an application protocol layer as well as an IP address tracking of source and destination, a protocol analysis function of each IP address/network, and a protocol analysis function at TCP/IP level.

Another aspect of the invention provides a method and device of packet transmission control and billing data generating on wired/wireless network, which can provide a monitoring function of real-time packet usage amount and distribution as well as packet service control function and make it possible to perform a statistical process and a network capacity estimation by use of the real-time packet usage amount data.

Another aspect of the invention provides a method and device of packet transmission control and billing data generating on wired/wireless network, which can promote the convenience of installation and operation and provide the unified data billing solution suitable for the wired/wireless combined environment because single device can generate preliminary billing data in the wired/wireless Internet even if a user terminal and PCX are connected to each other via wireless data link and PCX and web server are connected to each other via wired data link.

Another aspect of the invention provides a method and device of packet transmission control and billing data generating on wired/wireless network, which can detect the type of contents and packet amount data of each contents simultaneously through the protocol analysis.

Another aspect of the invention provides a method and device of packet transmission control and billing data generating on wired/wireless network, which unify and can perform the packet service control function and the billing data generation function, both essential functions of communication service provider.

Another aspect of the invention provides a packet service apparatus, comprising: a packet data input part for receiving a packet data through a network and storing the packet data in a shared memory, wherein the packet data comprises at least a source IP address and a destination IP address; a filtering part for determining whether the packet data stored in the shared memory satisfies with a predetermined filtering rule and deleting the packet data if the packet data satisfies with the predetermined filtering rule; a packet output part for transmitting the packet data correspondingly to the destination IP address if the packet data does not satisfy with the predetermined filtering rule; a protocol analyzing part for analyzing total amount of packet and user information by analyzing the packet data per application protocol if the packet data does not satisfy with the predetermined filtering rule; and a data storing part for converting the analyzed information by the protocol analyzing part correspondingly to a predetermined standard format and storing the converted information.

The packet service apparatus may further comprises a statistics processing part for generating a preliminary billing data using the converted information stored in the data storing part, wherein the preliminary billing data comprises information taken statistics and analyzed on a real-time basis.

The packet service apparatus may further comprise a packet data re-assembling part for re-assembling fragmented packet data into a logical packet data capable of analyzing by the protocol analyzing part when the packet data is fragmented by a characteristic of protocol.

The protocol analyzing part may further comprise a plurality of protocol analyzing parts specialized for the kind of the packet data.

The packet service apparatus may presume a TCP state of a receiving party to be a SYNRCVD state only after a SYN packet data is transmitted from a transmitting party to the receiving party and an ACK packet data corresponding to the SYN packet data is transmitted from the receiving party to the transmitting party.

The writable blocks of the shared memory can be maximized when a ReadStart value is equal to a NextRead value if the shared memory is a ring-shaped queue type. The operating algorithm for the shared memory may be a Balanced-Binary-Tree algorithm.

Still another aspect of the invention provides a method for controlling whether a packet data received from a transmitting party has to be transmitted to a receiving party in a packet. service apparatus of a wire/wireless Internet service system, comprising: receiving a packet data through a network, wherein the packet data comprises a source IP address and a destination IP address; storing the packet data in a shared memory; determining whether the packet data satisfies with a predetermined filtering rule; deleting the packet data if the packet data satisfies with the predetermined filtering rule; transmitting the packet data correspondingly to the destination IP address if the packet data does not satisfy with the predetermined filtering rule; generating a preliminary billing data by analyzing total amount of packet and user information analyzed by analyzing the packet data per application protocol if the packet data does not satisfy with the predetermined filtering rule; storing a converted information created by converting the preliminary billing data correspondingly to a predetermined standard format; and transmitting the converted information or the preliminary billing data to a billing apparatus when a transmission request is received from the billing apparatus.

The packet service apparatus can presume a TCP state of the receiving party to be a SYNRCVD state only after a SYN packet data is transmitted from the transmitting party to the receiving party and an ACK packet data corresponding to the SYN packet data is transmitted from the receiving party to the transmitting party.

The filtering rule may be for determining whether the source IP address or the destination IP address is equal to a prestored IP address to be filtered, whether the packet data has errors, whether the packet data is to be used for hacking or cracking, or whether the packet data is infected by a computer virus.

The method may further comprise the step of re-assembling fragmented packet data into a logical packet data capable of analyzing by a protocol analyzing part when the packet data is fragmented by a characteristic of protocol.

Still another aspect of the invention provides a computer-readable medium including a program containing computer-executable instructions for performing the method for controlling whether a packet data received from a transmitting party has to be transmitted to a receiving party in a packet service apparatus of a wire/wireless Internet service system, comprising: receiving a packet data through a network, wherein the packet data comprises a source IP address and a destination IP address; storing the packet data in a shared memory; determining whether the packet data satisfies with a predetermined filtering rule; deleting the packet data if the packet data satisfies with the predetermined filtering rule; transmitting the packet data correspondingly to the destination IP address if the packet data does not satisfy with the predetermined filtering rule; generating a preliminary billing data by analyzing total amount of packet and user information analyzed by analyzing the packet data per application protocol if the packet data does not satisfy with the predetermined filtering rule; storing a converted information created by converting the preliminary billing data correspondingly to a predetermined standard format; and transmitting the converted information or the preliminary billing data to a billing apparatus when a transmission request is received from the billing apparatus.

BRIEF DESCRIPTION OF THE DRAWINGS

FIG. 1B is a schematic diagram showing the conventional billing method in wireless Internet environment;

DETAILED DESCRIPTION OF CERTAIN EMBODIMENTS OF THE INVENTION

Figure 2A:
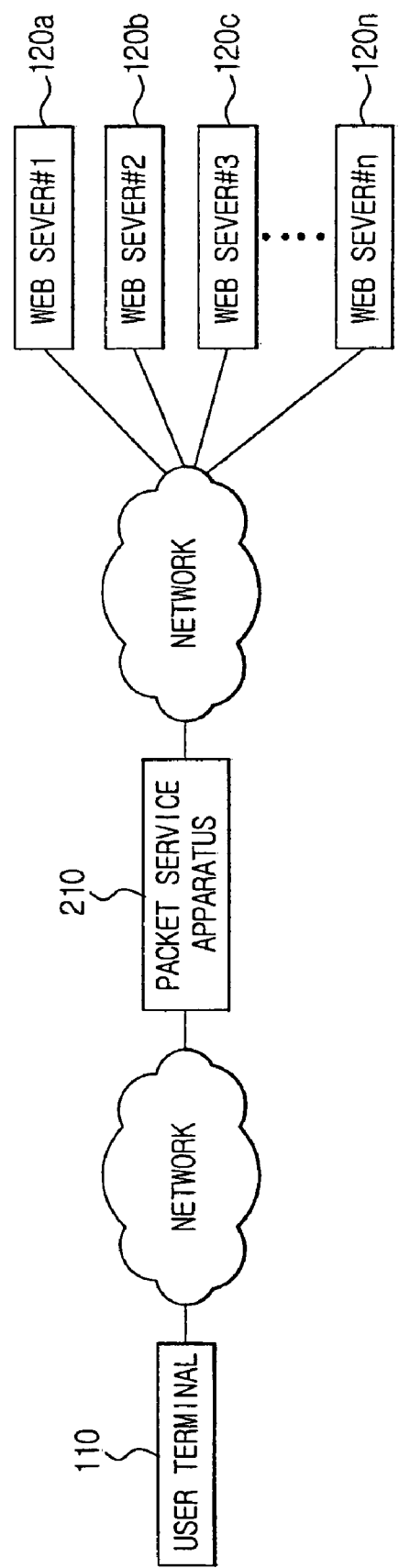
FIG. 2A is a schematic diagram showing the basic architecture for system for controlling the packet transmission and generating billing data in a wire network according to one preferred embodiment of the present invention.
Figure 2B:
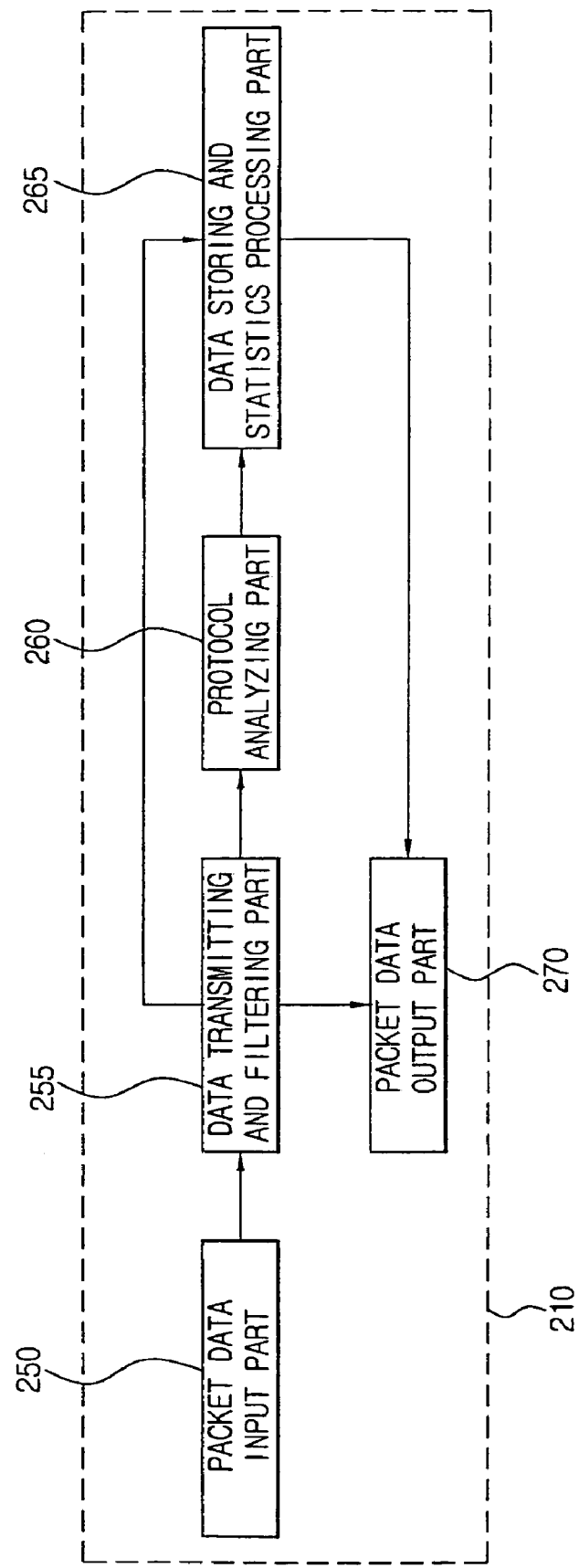
FIG. 2B is a block diagram of a packet service apparatus according to one preferred embodiment of the present invention.
Figure 2C:
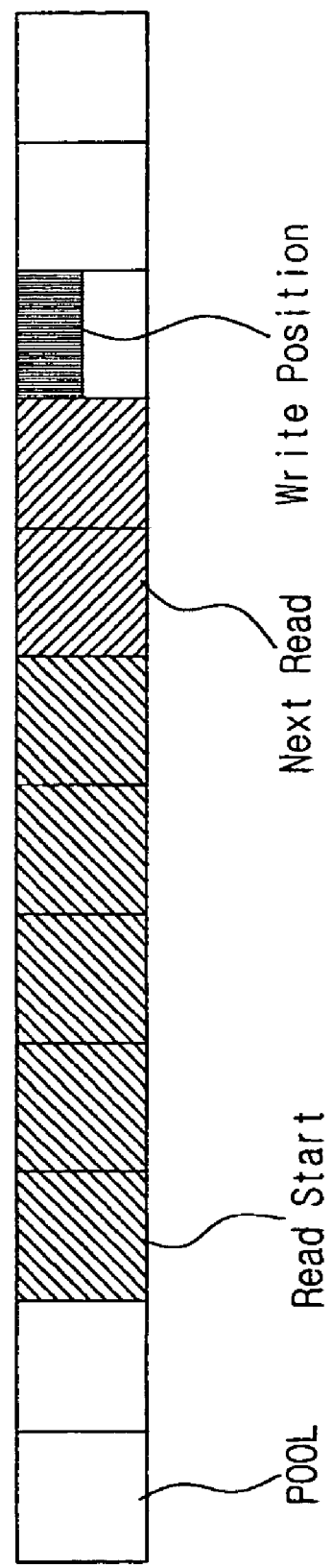
FIG. 2C is a diagram showing the method for operating a shared memory according to one preferred embodiment of the present invention.

FIG. 2A is a schematic diagram showing the basic architecture for system for controlling the packet transmission and generating billing data in a wire network according to one preferred embodiment of the present invention, FIG. 2B is a block diagram of a packet service apparatus according to one preferred embodiment of the present invention, and FIG. 2C is a diagram showing the method for operating a shared memory according to one preferred embodiment of the present invention.

Referring to FIG. 2A, the system for controlling the packet transmission and generating billing data in the wire network according to the present invention comprises a user terminal 110, a wire Internet service system, a packet service apparatus 210 and at least one web server 120a, 120b, 120c, ..., 120n (hereinafter, referred to as 120). But, the wire Internet service system will be mentioned as a kind of network for wire Internet service because the wire Internet service system is relatively little related with the core of the present invention, and the wire Internet service system may comprise the packet service apparatus 210. The user terminal 110, the packet service apparatus 210 and web server 120 respectively are coupled through the network.

As shown in FIG. 2A, all packet data are transmitted and received between the user terminal 110 and the web server 120 through the packet service apparatus 210.

Figure 1A:
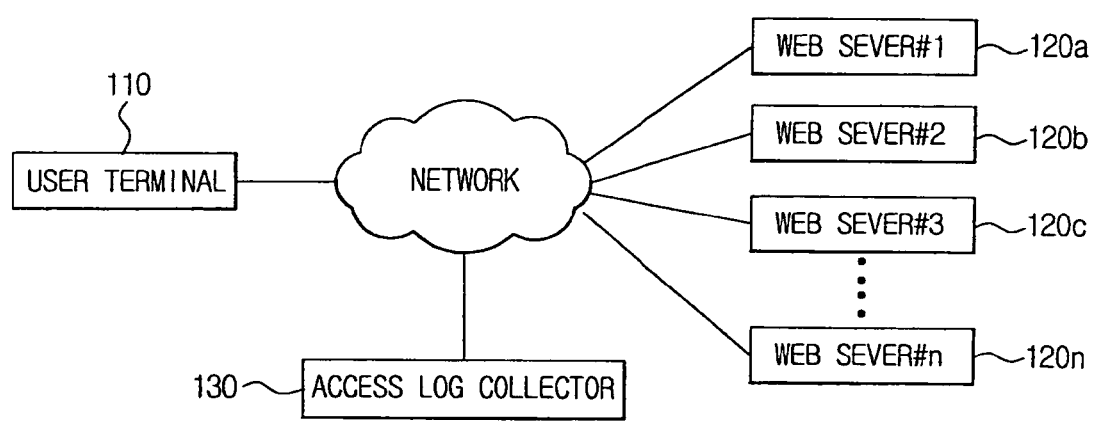
FIG. 1A is a schematic diagram showing the conventional billing method in wired Internet environment.

That is, it will be easily understood that the packet service apparatus 210 can determine whether packet data have to be transmitted to the user terminal 110 or the web server 120 and generate billing data corresponding to the transmission of the packet data if the packet service apparatus 210 can analyze the characteristics of the packet data transmitted and received between the user terminal 110 and the web server 120. Therefore, if the packet service apparatus 210 according to the present invention is used, the communication service system does not have to comprise a billing-log collecting apparatus (refer to 130 in FIG. 1A or 160 in FIG. 1B) requested necessarily in the conventional wire Internet environment.

In addition, the packet service apparatus 210 can determine whether the packet data has to be transmitted more effectively than the conventional Firewall system determining whether the packet data has to be transmitted by inquiring a source IP address and a destination IP address only, because the packet service apparatus 210 can analyze information (e.g., the source of the packet data, the number of the packet data, the distribution and statistics of the packet data, the contents of the packet data and the like) corresponding to the packet data transmitted and received. As a result, a packet data management can be performed effectively by not transmitting the packet data to receiving party (i.e., receiver) when the packet data is decided as transmission refusal.

The packet service apparatus 210 can be operated safely even though malicious attacks such as Denial of Service (DOS) attacks are attempted because the packet service apparatus 210 determines whether the packet data has to be transmitted by using various factors (e.g., if information in an arbitrary field of application protocol are equal to information registered in the filtering rule, if the number of the same packet data being transmitted from an source IP address to a destination IP address exceeds the number set as a critical value and the like)

In addition, the packet service apparatus 210 can provide analysis information (e.g., information analyzed by size of the packet data, number of the packet data transmitted and received, protocols or the like) for network monitoring on a real-time basis.

In addition, although only one packet service apparatus 210 is shown in FIG. 2A, the system for controlling the packet transmission and generating billing data can comprise a group comprising a plurality of packet service apparatuses to achieve objects of load balancing, mass processing and the like. When the system comprises the group, only packet service apparatus operated without error transmits packet data to improve the operation efficiency of the system by mutually checking the operating condition among packet service apparatuses.

Hereinafter, the function of the packet service apparatus 210 shall be explained briefly.

All packet data transmitted from the user terminal 110 are transmitted to a receiving party corresponding to a destination address through the packet service apparatus 210 after the user terminal 110 is accessed to the wire Internet. In this process, the packet service apparatus 210 can analyze network information, the contents of the packet data and the total amount of the packet data by analyzing the packet data on the basis of application protocols, after recognizing who a user is by using the source IP address in the packet data and then re-assembling the packets existing in IP protocol, TCP protocol and UDP protocol as logical packet data by using port information of the transmitting party (i.e., sender). In addition, the packet service apparatus 210 stores the analyzed information periodically in order to enable to be used as preliminary billing data corresponding to the user and/or statistics information by services, servers and users.

Referring to FIG. 2B, the packer service apparatus 210 according to the present invention comprises a packet data input part 250, a data transmitting and filtering part 255, a Protocol analyzing part 260, a data storing and statistics processing part 265 and packet data output part 270.

The packet data input part 250 receives packet data from the user terminal 110 through the network and transmits the received packet data to the data transmitting and filtering part 255. The packet data input part 250 receives the packet data by using at least one among socket, Data Link Provider Interface (DLPI), protocol device driver exclusively used for the packet service apparatus 210 and the like according to the Flatform installed to operate the packet service apparatus 210. In particular, the protocol device driver exclusively used for the packet service apparatus 210 has superior efficiency as compared with any other method for receiving packet data because it stores the received packet data directly from Kernel area of operating system (OS) to a shared memory for the data transmitting and filtering part 255. And, the packet service apparatus 210 performs succeeding process by directly duplicating the packet data in a user memory by using Kernel's function, or by directly writing the packet data by using the shared memory accessible from the Kernel area and user area.

In general, in computer programming, the shared memory is a method to exchange data more quickly by program processes than by reading and/or writing using the regular operating system services. For example, a client process may have data to pass to a server process that the server process is to modify and return to the client. Ordinarily, this would require the client writing to an output file (using the buffers of the operating system) and the server then reading that file as input from the buffers to its own work space. Using a designated area of the shared memory, the data can be made directly accessible to both processes without having to use the system services. To put the data in the shared memory, the client gets access to the shared memory after checking a semaphore value, writes the data, and then resets the semaphore to signal to the server (which periodically checks shared memory for possible input) that data is waiting. In turn, the server process writes data back to the shared memory area, using the semaphore to indicate that data is ready to be read.

Hereinafter, the method of improving the efficiency of the packet service apparatus 210 shall be described with reference to FIG. 2C.

As mentioned above, each of the components of the packet service apparatus according to the present invention communicates mutually by using the shared memory. In most cases, the functions associated with lock (e.g., semaphore, mutex and the like) provided by operation system (OS) to prevent Deadlock and the like.

But, in most cases, these functions are operated very slowly and may bring about lowering of system speed.

Therefore, the packet service apparatus 210 improves the efficiency by using the method of minimizing the use of lock function such as following method.

As shown in FIG. 2C, the shared memory of the packet service apparatus 210 is basically a ring-shaped queue type, and 'WritePosition' is increased whenever data are written. Data can be written up to right front position of 'ReadStart', and 'NextRead' is increased whenever data are read.

The area from 'ReadStart' to 'NextRead' is area to be protected in the shared memory. Therefore, components using the shared memory cannot copy any data in the area to maintain data stored in the area.

But, if some data stored in the area are not necessary any more, data can be written in the area by increasing value corresponding to 'ReadStart' as much as the size of the unnecessary data. For example, all data stored in the area are not necessary any more, all area of the shared memory can be set as writable area by equally setting the value corresponding to 'ReadStart' and the value corresponding to 'NextRead'.

As a characteristics of operating shared memory, the packet service apparatus 210 according to the present invention can improve the efficiency of the operating system because the number to be lock can be minimized because it performs a reading process as a unit of 'Pool' in the shared memory and the information referred by component writing data in the shared memory and component reading data from the shared memory are set to enable to be distinguished clearly.

Referring to FIG. 2B again, the data transmitting and filtering part 255 in the packet service apparatus 210 receives packet data from the packet data input means 250, and determines whether the packet data has to be transmitted or ignored by the re-assembling process of re-assembling fragmented packet data according to IP protocol, TCP protocol and UDP protocol, checksum error check, filtering rule and the like, and transmits the packet data to be transmitted. In addition, the data transmitting and filtering part 255 transmits packet data to the protocol analyzing part 260 to be analyzed the packet in application protocol level. The data transmitting and filtering part 255 may be combination of a plurality of sub-components separated according to functions.

The protocol analyzing part 260 analyzes the total amount of the packet data, the contents of the packet data and the like by analyzing the packet data according to application protocols. The protocol analyzing part 260 may be the combination of a plurality of subordinate protocol analyzing parts having individual usage. For example, the protocol analyzing part 260 can comprises a first subordinate protocol analyzing part for analyzing HTTP protocol, a second subordinate protocol analyzing part for analyzing WAP protocol and a third subordinate protocol analyzing part for analyzing DNS protocol. In this case, a plurality of subordinate protocol analyzing parts may use an analyzing program exclusively used for arbitrary protocol.

The analyzing programs installed in the protocol analyzing part 260 is for analyzing and/or extracting information corresponding to the source IP address, the destination IP address, the port, the user, the name and size of the requested data, whether the packet has to be re-transmitted and the like. And the analyzed information is transmitted to the data storing and statistics processing part 265 by the protocol analyzing part 260.

The protocol analyzing part 260 can add and/or remove components for analyzing correspondingly to the operation environment of the packet service apparatus or user's setup without the operation interruption of the packet service apparatus 210. In addition, the protocol analyzing part 260 can analyze arbitrary packet data according to not only standard protocol (e.g., WAP, HTTP, FTP and the like) but also specialized or revised standard protocol by operation environment. And thus, the protocol analyzing part 260 can analyze or extract information extracted from the packet data itself (e.g., the total amount of the packet data, used amount by sessions, used amount by protocols, total amount of the packet data with errors and the like), information acquired by analyzing data pattern and the like.

The data storing and statistics processing part 265 performs the functions of storing the information generated by the protocol analyzing part 260 according to the predetermined standard format, taking statistics on a real-time basis and analyzing the information. The analyzed information can be used for billing and the like. The data storing and statistics processing part 265 may be the combination of a plurality of components (e.g., a data storing part and a statistics processing part) divided by individual functions.

Whenever the request is received from any other components or periodically according to the user's setup or the operation environment, the data storing and statistics processing part 265 converts information (e.g., state, log information) corresponding to packet/session established by components into the converted information corresponding to the predetermined format and stores the converted information in a disk. The predetermined format is, for example, a format that an operator can analyze personally, it can be used for any other software or protocol analyzing apparatus and the like.

In addition, the data storing and statistics processing part 265 generates statistics information on the basis of the data stored in the disk and data to be displayed on the operator's monitor.

The packet data output part 270 performs the functions of transmitting the packet data received from the packet data input part 250 to the predetermined destination, transmitting the converted data by the data storing and statistics processing part 265 to an exterior billing server. If the packet data is filtered by the data transmitting and filtering part 255, the packet data is not transmitted to the packet data output part 270. In the result, the packet data is not transmitted to the predetermined destination.

Figure 3A:
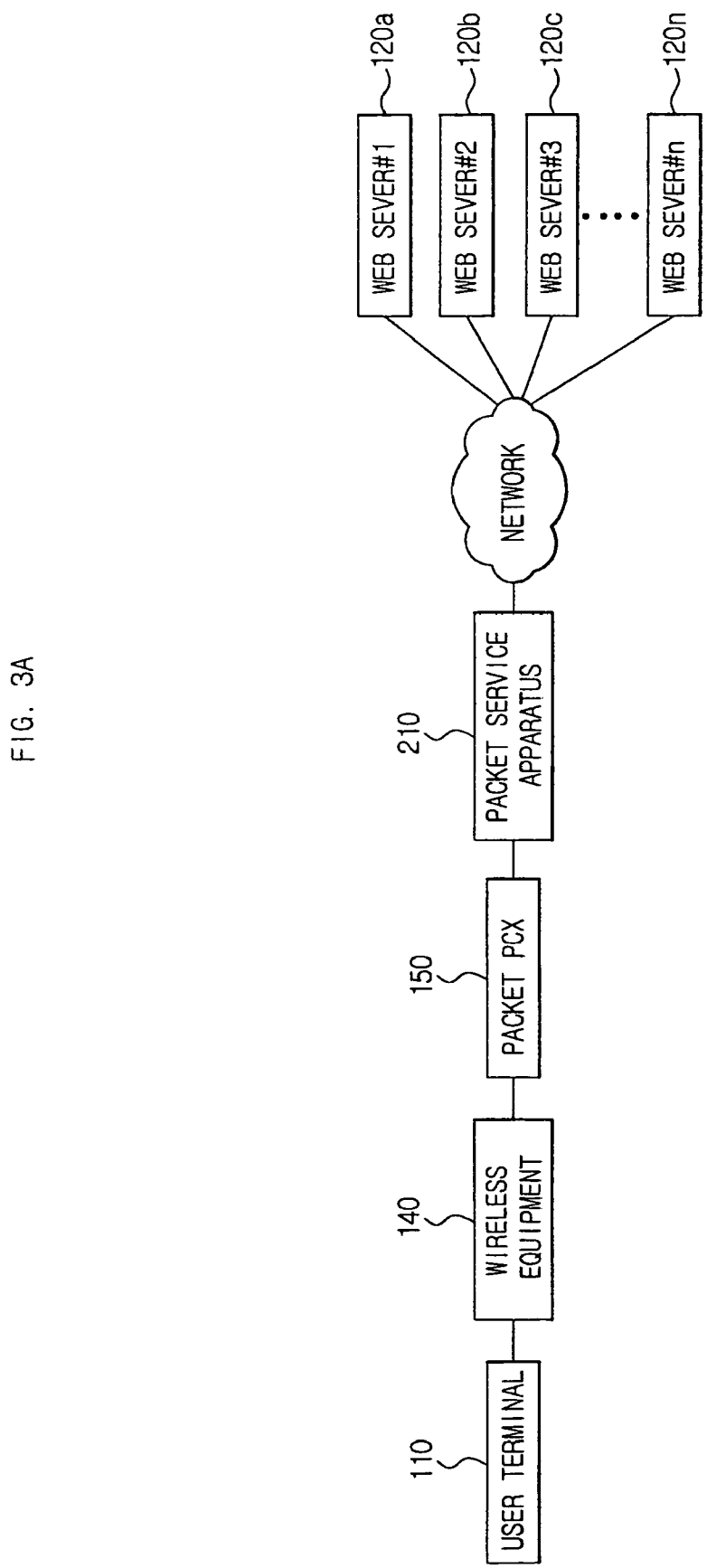
FIG. 3A is a schematic diagram showing the basic architecture for system for controlling the packet transmission and generating billing data in a wireless network according to another preferred embodiment of the present invention.
Figure 3B:
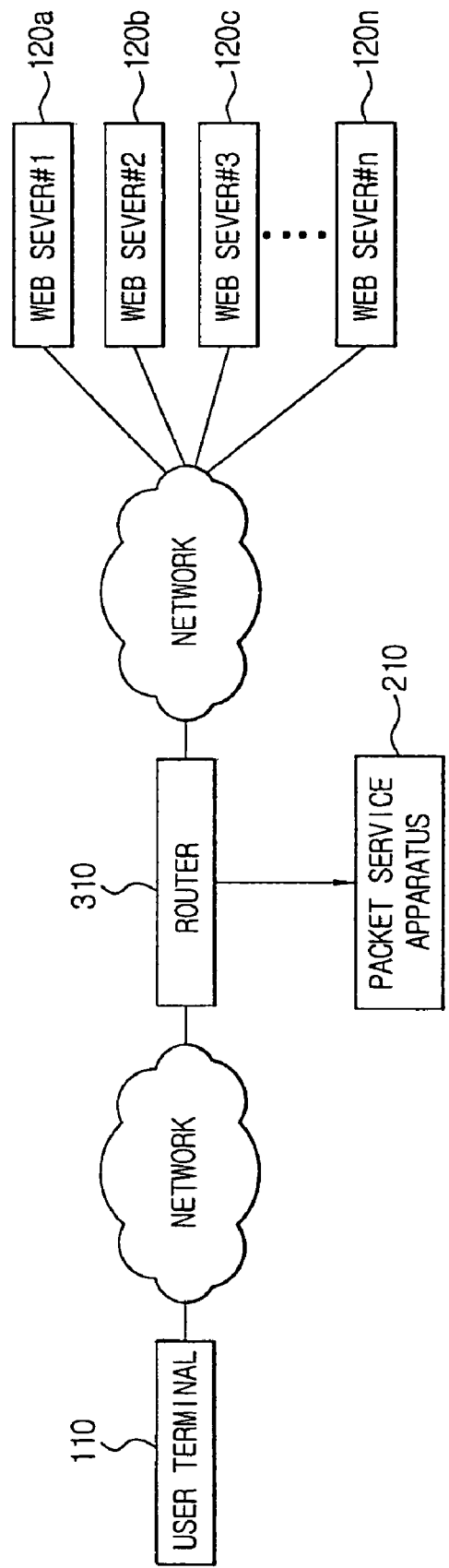
FIG. 3B is a schematic diagram showing the basic architecture for system for controlling the packet transmission and generating billing data in a wire network according to still another preferred embodiment of the present invention.
Figure 3C:
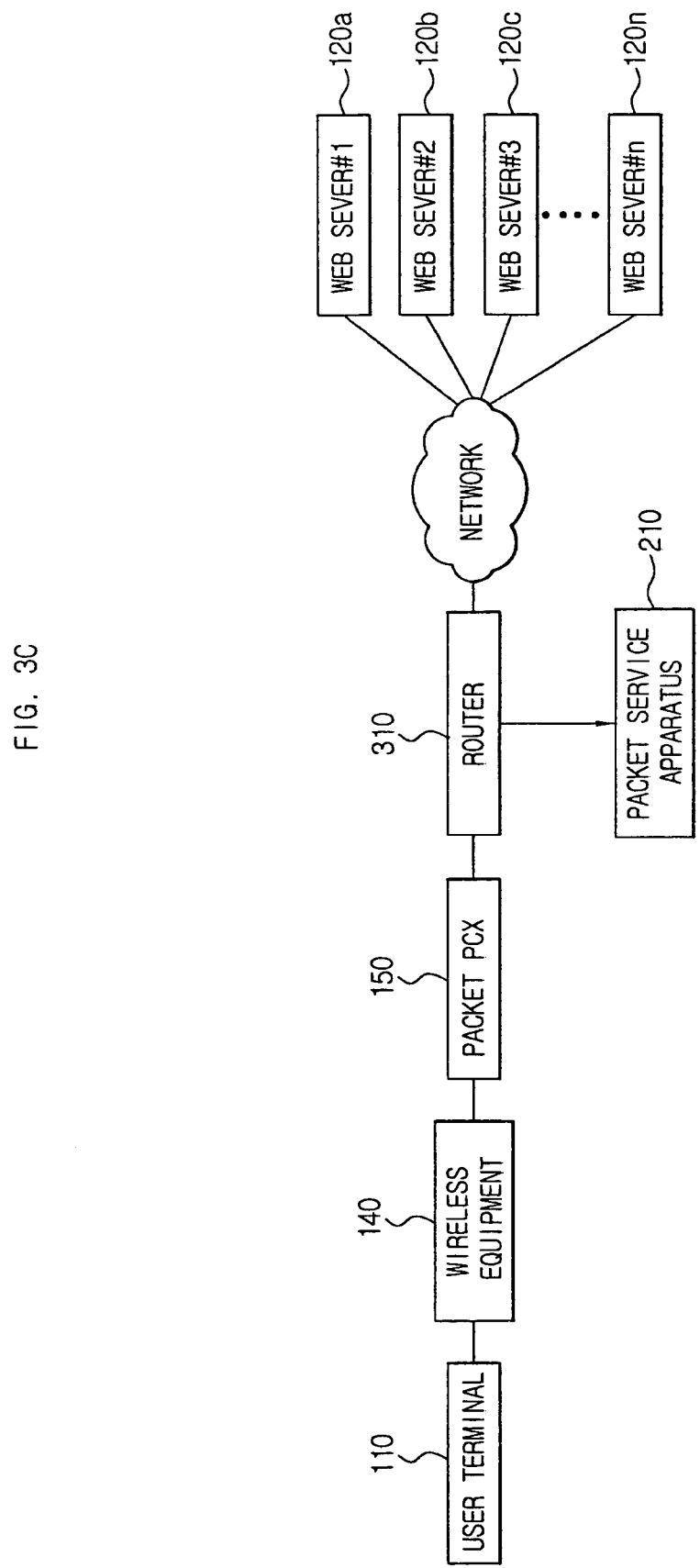
FIG. 3C is a schematic diagram showing the basic architecture for system for controlling the packet transmission and generating billing data in a wireless network according to another preferred embodiment of the present invention.

FIG. 3A is a schematic diagram showing the basic architecture for system for controlling the packet transmission and generating billing data in a wireless network according to another preferred embodiment of the present invention, FIG. 3B is a schematic diagram showing the basic architecture for system for controlling the packet transmission and generating billing data in a wire network according to still another preferred embodiment of the present invention, and FIG. 3C is a schematic diagram showing the basic architecture for system for controlling the packet transmission and generating billing data in a wireless network according to another preferred embodiment of the present invention.

The example of arranging the packet service apparatus 210 was already described with reference to FIG. 2A. In addition, the packet service apparatus 210 can be variously arranged as shown in FIG. 3A to 3C.

The structure shown in FIG. 3A will not be described further because it is similar to the structure shown in FIG. 2A.

The packet service apparatus 210 can be coupled with a router 310 in parallel as shown in FIG. 3B and FIG. 3C. When the packet service apparatus 210 is coupled with the router 310 in parallel, the router 310 (or switch hub and the like) transmits the packet data to the destination and the packet service apparatus 210 at the same time. The packet service apparatus stores analyzed information after analyzing the received packet data and taking statistics using the packet data.

Unlikely the packet service apparatus 210 shown in FIG. 2A and FIG. 3A, in the structure shown in FIG. 3B and FIG. 3C, the packet service apparatus 210 may be unable to control for transmitting the packet data because the router 310 already transmitted the packet data to the destination when the packet service apparatus received the same packet data from the router 310. In this case, the control for transmitting the packet data to the destination can be also done if the router 310 transmits the packet data to the destination only after the transmission permission is received from the packet service apparatus 210.

In addition, the packet service apparatus 210 can perform the functions of monitoring, taking statistics and generating billing data even if the packet service apparatus 210 can not perform the function of controlling the transmission of the packet data because it is coupled in parallel with the router 310 as shown in FIG. 3B and FIG. 3C.

In addition, if the packet service apparatus 310 is coupled in parallel with the router 310 as shown in FIG. 3B and FIG. 3C, the transmission and reception of the packet data can be done without interruption even if the packet service apparatus 210 has errors in it.

Figure 4:
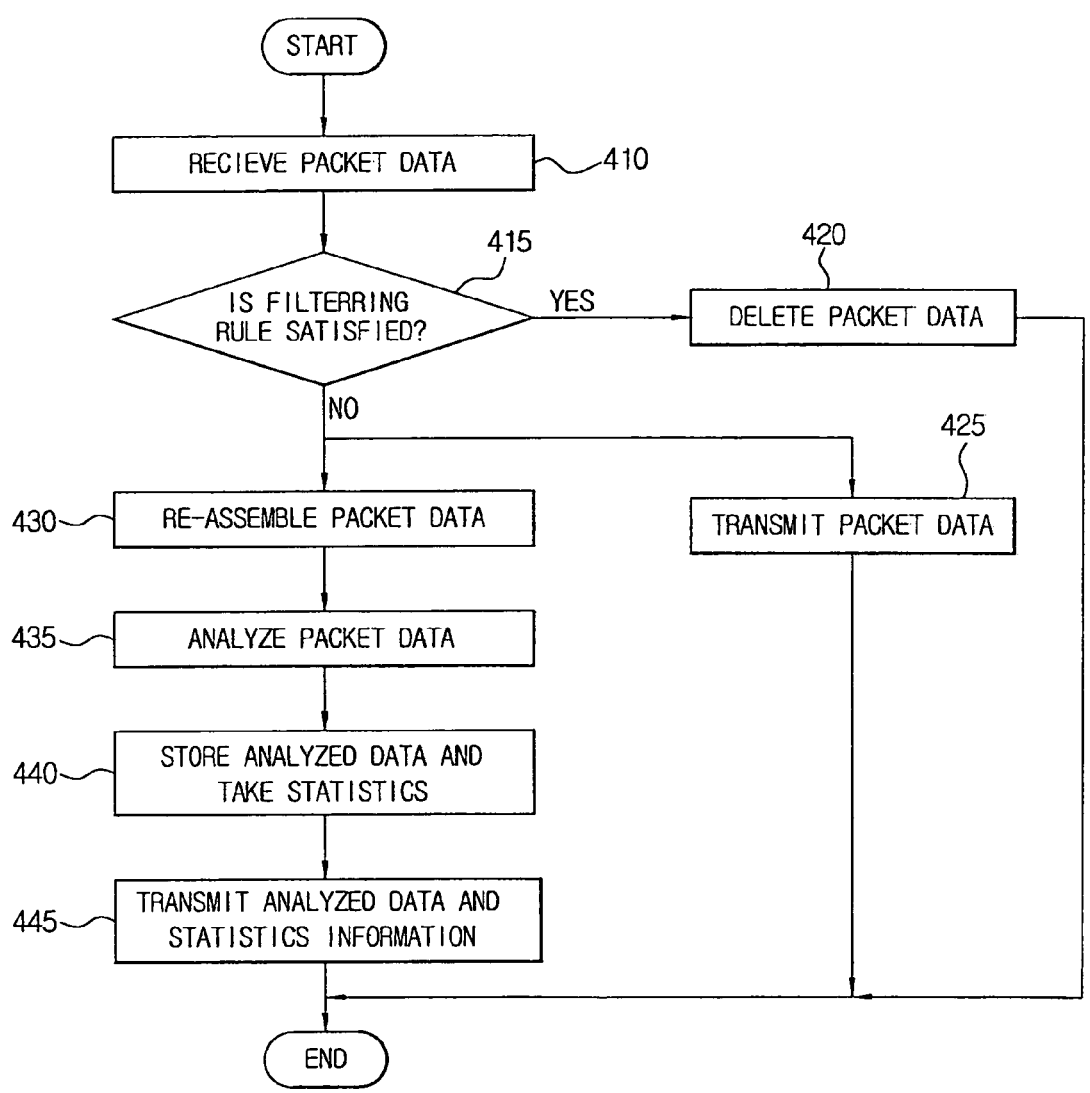
FIG. 4 is a flowchart showing the method for controlling packet transmission and generating billing data in packet service apparatus in wire/wireless network according to one preferred embodiment of the present invention.

FIG. 4 is a flowchart showing the method for controlling packet transmission and generating billing data in the packet service apparatus in wire/wireless network according to one preferred embodiment of the present invention.

As described above, each step shown in FIG. 4 can be performed respectively by each component of the packet service apparatus 210, but for the convenience of comprehension, it shall be explained as if the packet service apparatus 210 performs all steps shown in FIG. 4.

Referring to FIG. 4, the packet service apparatus 210 receives packet data from the user terminal 110 or web server 120 through network (step 410). The received packet data are stored in the shared memory (e.g., Input buffer and the like)

The packet service apparatus 210 determines whether the packet data received at step 410 satisfies with the predetermined filtering rule (step 415).

For example, the filtering rule is for determining whether the source IP address or the destination IP address is equal to a pre-stored IP address to be filtered, whether the packet data has errors by using checksum or parity check, whether the packet data is to be used for hacking, cracking or Denial of Service (DOS), or whether the packet data is infected by a computer virus. The packet service apparatus does not transmit the packet data satisfying with the filtering rule to the receiving party.

If the packet data satisfies with the filtering rule, the packet service apparatus 210 deletes the received packet data (step 420). But, if the packet data does not satisfy with the filtering rule, both step 425 and step 430 are performed. That is, the packet service apparatus 210 transmits the packet data to the receiving party corresponding to the destination IP address (step 425), and re-assembles the packet data received at step 410 (step 430). But, if both the packet service apparatus 210 and the router 310 are comprised independently in the system as shown in FIG. 3B and FIG. 3C, the router 310 can perform step 425.

The re-assembling process performed at step 430 is for generating one logical packet data capable of being analyzed according to application protocols by re-assembling packet data fragmented by the characteristics of protocols such as IP, TCP, UDP and the like. If the packet data does not have to be re-assembled, step 430 can be omitted. If the packet data has to be re-assembled, the fragmented packet data received are stored in a Buffer (e.g., Hash-Tree buffer and the like), the re-assembled packet data (i.e., logical packet data) and the packet data that do not have to be re-assembled are processed by ICMP, TCP, UDP and the like according to header information of the packet data. In particular, in case of TCP, the packet service apparatus 210 determines which session is related to the packet data by session management that can be executed by using Hash-Tree algorithm. Up to now, the conventional Hash-List algorithm is mostly used for performing the functions of inserting, deleting and retrieving data to achieve object for re-assembling TCP/IP or upper protocols by relation of packet data or managing session. But, the Hash-List algorithm requires much time for retrieving if specified key sets is inserted in a Hash-List. Therefore, the present invention applies to Balanced-Binary-Tree algorithm to solve the aforementioned problem even if specified key sets gets together in a Hash node.

The method of the packet service apparatus 210 presuming the connection state of the user terminal 110 and the web server 120 and maintaining the connection between the user terminal 110 and the web server 120 will be described in detail later with reference to FIG. 5A to 5D.

The packet service apparatus 210 analyzes the packet data re-assembled at step 430 (step 435). As described above, the packet service apparatus 210 can comprise a plurality of protocol analyzing parts 260. That is because the protocols for transmitting packet data through network are various including HTTP, WAP, FTP, TELNET, RTP, RTCP and the like, and processing methods respectively are different due to the characteristics of protocols. In one embodiment, the packet service apparatus 210 comprises a plurality of protocol analyzing parts 260 exclusively used for various protocols such as HTTP, WAP, FTP and so on, in order to analyze each of packet data effectively. And, the protocol analyzing part 260 analyzes and/or extracts user information, the amount of packet data, contents information and the like by the packet data.

Packet service apparatus 210 stores analyzed information and takes statistics by using information analyzed at step 435. At this time, the packet service apparatus 210 generates statistics information (e.g., statistics information by services, servers and users and the like) and stores the statistics information in a storing medium.

Then, the packet service apparatus 210 transmits the statistics information stored at step 440 to an exterior apparatus (or another apparatus in the same Internet service system) through network when a transmission request for receiving preliminary billing data is received from the exterior apparatus (or another apparatus in the same Internet service system) (step 445).

Like this, the packet service apparatus 210 according to the present invention can perform both the function for controlling transmission of the packet data and the function for generating preliminary billing data simultaneously.

That is, the packet service apparatus 210 according to the present invention can ignore or delete the packet data satisfying with the predetermined filtering rule (e.g., Firewall, Network Intrusion Detection & Prevention System (NIDS) and the like), or transmit the received packet data to the destination according to the operator's setup and/or operation environment. In addition, the packet service apparatus 210 can store the analyzed data in the disk or storing medium in an exterior network after converting the received data into the predetermined format such that an operator can analyze personally by using operator terminal, it can be used for any other software or protocol analyzing apparatus and the like.

Figure 5A:
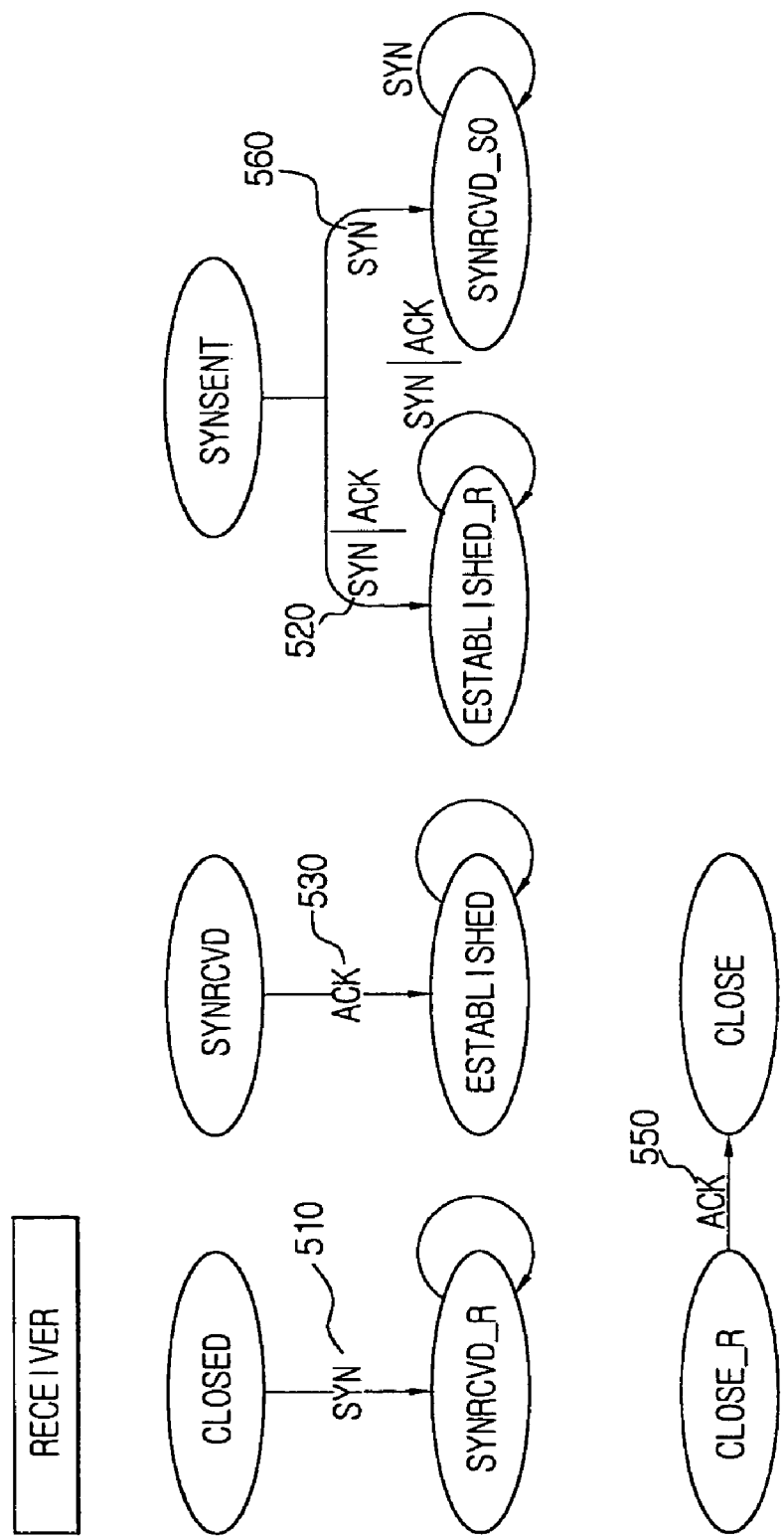
FIG. 5A is a TCP state diagram for transmitting party (i.e., sender) according to one preferred embodiment of the present invention.
Figure 5B:
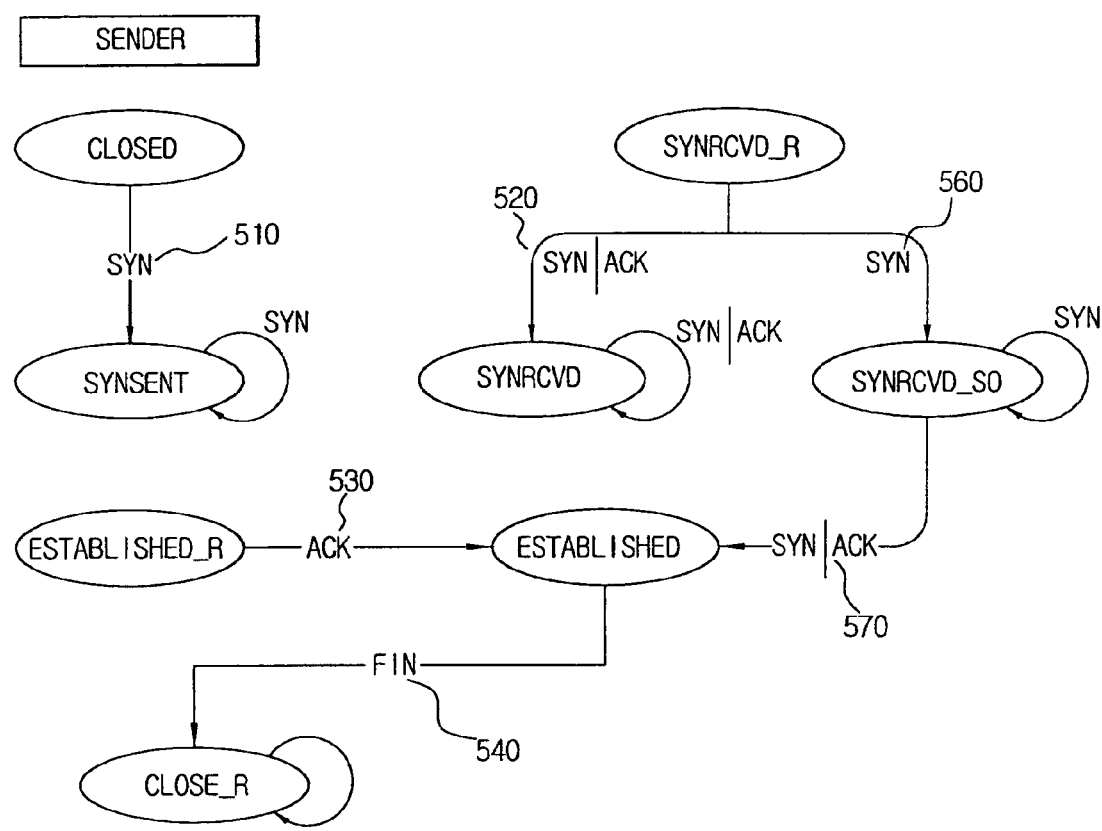
FIG. 5B is a TCP state diagram for receiving party (i.e., receiver) according to one preferred embodiment of the present invention.
Figure 5C:
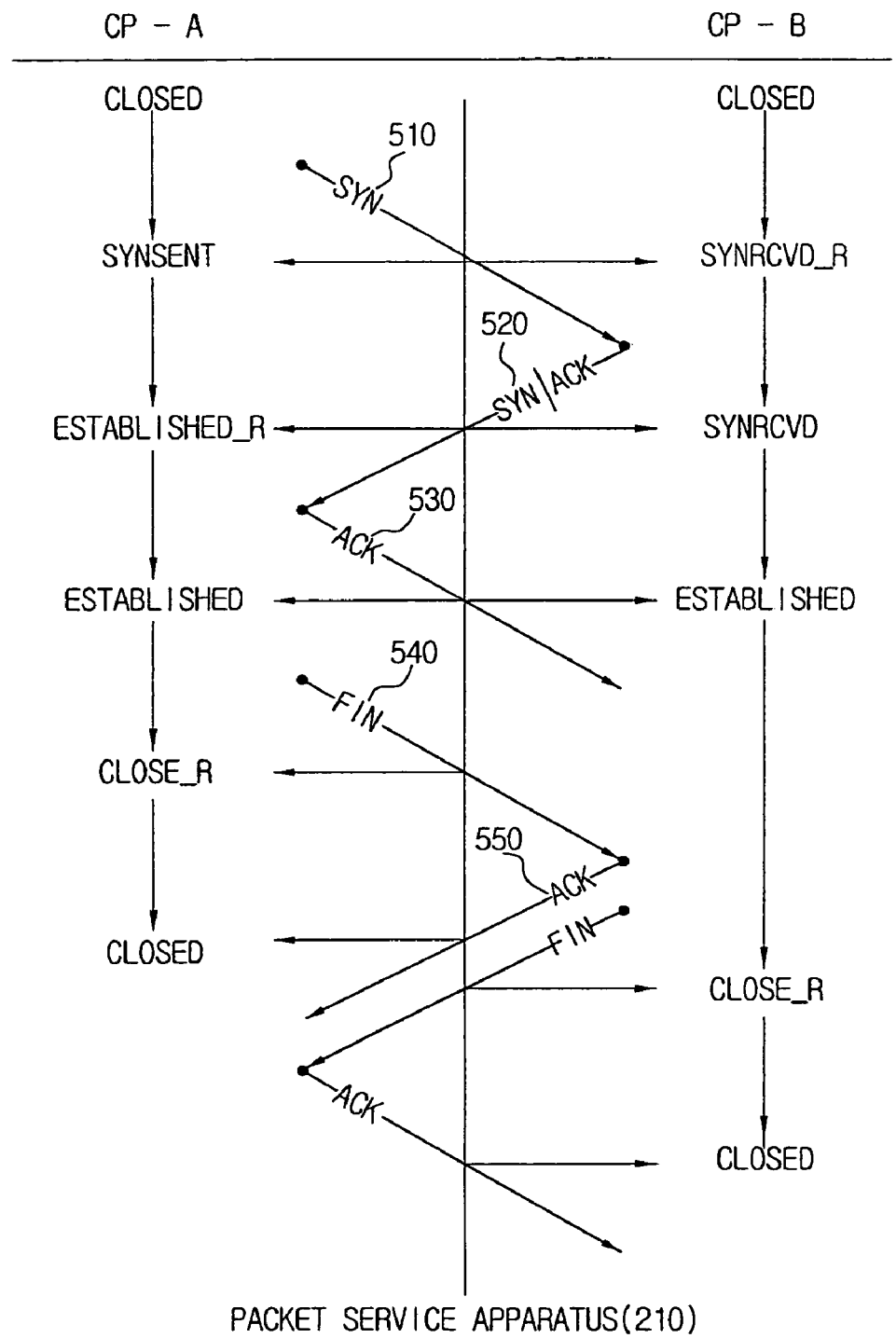
FIG. 5C is a schematic diagram showing data transmitted and received between the transmitting party and the receiving party according to one preferred embodiment of the present invention.
Figure 5D:
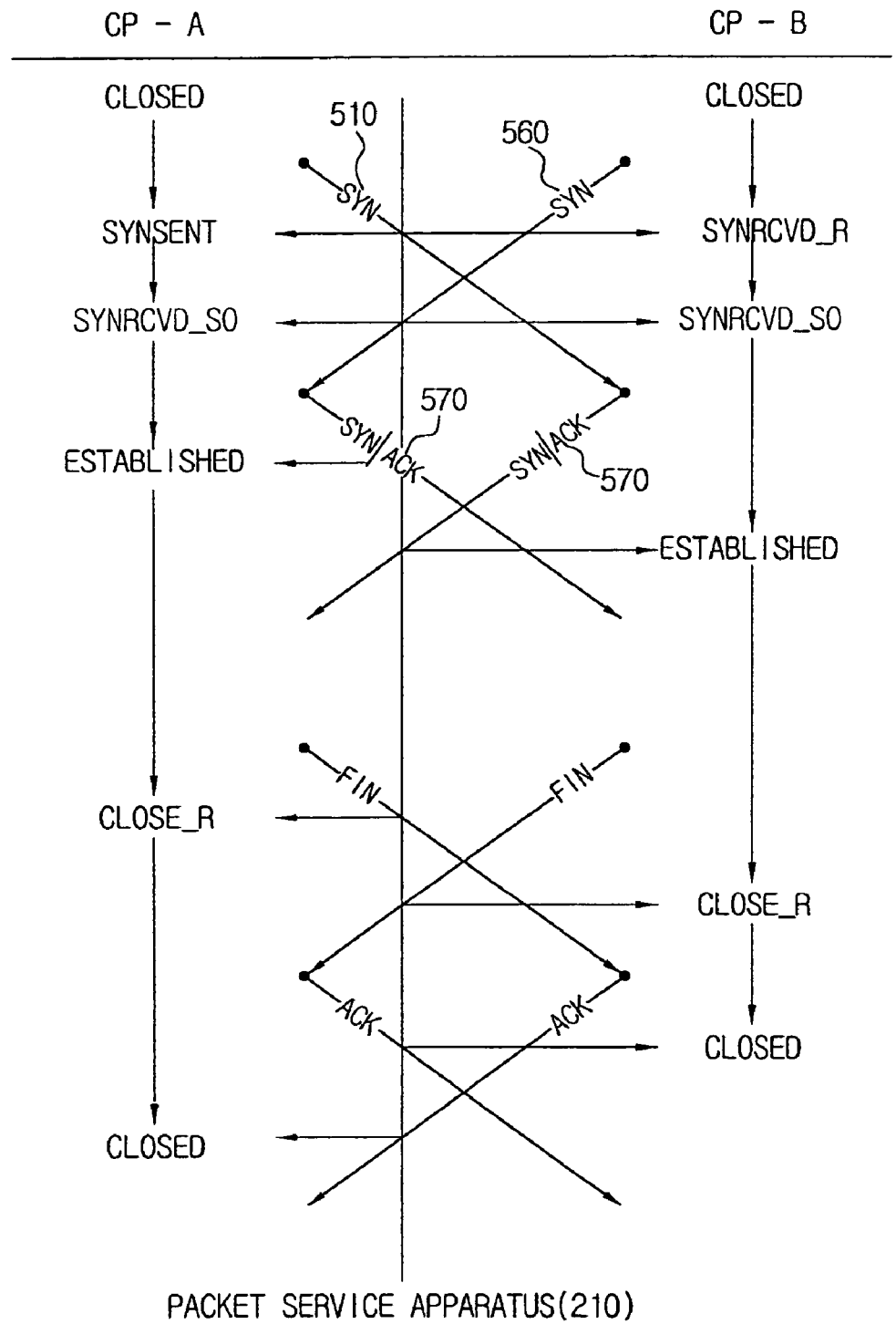
FIG. 5D is a schematic diagram showing data transmitted and received between the transmitting party and the receiving party in case of simultaneous-open or simultaneous-close according to one preferred embodiment of the present invention.

FIG. 5A is a TCP state diagram for transmitting party (i.e., sender) according to one preferred embodiment of the present invention, FIG. 5B is a TCP state diagram for receiving party (i.e., receiver) according to one preferred embodiment of the present invention, FIG. SC is a schematic diagram showing data transmitted and received between the transmitting party and the receiving party according to one preferred embodiment of the present invention, and FIG. 5D is a schematic diagram showing data transmitted and received between the transmitting party and the receiving party in case of simultaneous-open or simultaneous-close according to one preferred embodiment of the present invention.

As described above, the packet service apparatus 210 according to the present invention receives packet data from the transmitting party (e.g., the user terminal 110 or the web server 120) and transmits the packet data to the receiving party (e.g., the web server 120 or the user terminal 110).

Therefore, the packet service apparatus 210 cannot presume that the state of the transmitting party is SYNSENT and the state of the receiving party is SYN-RECEIVED (SYN-CVD), even though the transmitting party transmits the packet data set as SYN flag for TCP connection to the receiving party.

This is because the state of the receiving party is not SYN-RCVD, in case that the receiving party is unable to process due to network error and the like even though the packet service apparatus 210 receives packet data without errors from the transmitting party and transmits the packet data without errors to the receiving party.

Therefore, the packet service apparatus 210 determines the states of them only after the first packet data (e.g., TCP packet data set as SYN flag) is transmitted to the receiving party, and then maintains the states of them only when the second packet data set as SYN and ACK is transmitted from the receiving party to transmitting party without errors. That is, the packet service apparatus 210 determines that the receiving party receives the first packet data without errors only when the second packet data set as SYN flag is received from the receiving party.

The packet service apparatus 210 manages the state of the transmitting party and/or the receiving party as ready state (i.e., state previous to state transition) having the name of *_R (e.g., SYNRCVD_R, CLOSE_R, ESTABLISHED_R and the like) in arbitrary steps.

Referring to FIG. 5A to 5C, step 510 is a step that the CP-A (Connection Point—A, that is a sender or a receiver) transmits SYN packet data synchronized by sequence number to the CP-B (Connection Point—B, that is a receiver or a sender) to initialize connection. In this case, the conventional packet data relaying apparatus presumes the state of the CP-B as SYNRCVD right after the SYN packet data is transmitted from the CP-A to the CP-B. But, the presumption by the conventional packet data relaying apparatus is not always right by the aforementioned problem. Therefore, the packet service apparatus 210 applies to a method of presuming the state of receiving party as ready state (i.e., SYNRCVD_R) until the SYN|ACK packet data is received from CP-B at step 520.

At step 520, when the SYN|ACK packet data is transmitted from the CP-B to the CP-A, the packet service apparatus 210 presumes the state of the CP-A as ESTABLISHED_R state. And then, the packet service apparatus 210 presumes that the state of the CP-A and the state of the CP-B are ESTABLISHED state when ACK packet data corresponding to the SYN|ACK packet data is transmitted from the CP-A to the CP-B.

The steps mentioned above are applied to succeeding steps in the same manner. That is, the packet service apparatus 210 presumes the state of the CP-A as CLOSE_R when FIN packet data (i.e., it means the transmitting party completes the data transmission) is transmitted from the CP-A to the CP-B (step 540). And then, the packet service apparatus 210 presumes the state of the CP-A as CLOSED when the ACK packet data is transmitted from the CP-B to the CP-A (step 550). The same method is applied to the case of changing the state of the CP-B into CLOSED.

Hereafter, the method for the packet service apparatus 210 presuming the state of the CP-A and the state of the CP-B in case that both the CP-A and the CP-B transmit SYN packet data to the other simultaneously shall be described with reference to FIG. 5A, FIG. 5B and FIG. 5D.

When first SYN packet data is transmitted from the CP-A to the CP-B (step 510) and second SYN packet data is transmitted from the CP-B to the CP-A (step 560) at the same time, the packet service apparatus 210 presumes the state of both the CP-A and the CP-B as SYNRCVD_SO by transmitting the second SYN packet data after presuming the state of the CP-A as SYNSENT and the state of the CP-B as SYNRCVD_R by transmitting the first SYN packet data.

Then, the packet service apparatus 210 presumes the state of both the CP-A and the CP-B as ESTABLISHED when both the CP-A and the CP-B are transmit SYN|ACK packet data as a response corresponding to SYN packet data to the other (Step 570).

Additional description about the procedure of changing the state of both the CP-A and the CP-B into CLOSED shall be omitted because it can be understood easily by the aforementioned description.

As described above, the method and device of packet transmission control and billing data generating on wired/wireless network can deal with a hacking such as DOS by packet access control through analyzing a data packet at application protocol layer as well as provide the IP address tracking of source and destination, the protocol analysis function of each IP address/network, and the protocol analysis function at TCP/IP level.

And, the present invention provides the monitoring function of real-time packet usage amount and distribution as well as packet service control function and makes it possible to perform a statistical process and a network capacity estimation by use of the real-time packet usage amount data.

Also, the present invention can encourage the convenience of installation and operation and provide the unified data billing solution suitable for the wired/wireless combined environment because single device can generate preliminary billing data in the wired/wireless Internet even if a user terminal and PCX are connected to each other via wireless data link and PCX and web server are connected to each other via wired data link.

Also, the present invention can detect the type of contents and packet amount data of each contents simultaneously through the protocol analysis.

Also, the present invention can perform the packet service control function and the billing data generation function, both essential functions of communication service provider, so that it is possible to reduce the cost and simplify the system.

While the above description has pointed out novel features of the invention as applied to various embodiments, the skilled person will understand that various omissions, substitutions, and changes in the form and details of the device of the device or process illustrated may be made without departing from the scope of the invention. Therefore, the scope of the invention is defined by the appended claims rather than by the foregoing description. All variations coming within the meaning and rage of equivalency of the claims are embraced within their scope.

What is claimed is:

1. A packet service apparatus, comprising:
   a packet data input part for receiving a packet data through a network and storing the packet data in a shared memory, wherein the packet data comprises at least a source IP address and a destination IP address, and wherein the shared memory is shared by and accessible from i) a kernel area of an operating system of the packet service apparatus and ii) a user area;
   a filtering part for determining whether the packet data stored in the shared memory satisfies with a predetermined filtering rule and deleting the packet data if the packet data satisfies with the predetermined filtering rule;
   a packet output part for transmitting the packet data correspondingly to the destination IP address if the packet data does not satisfy with the predetermined filtering rule;
   a protocol analyzing part for analyzing total amount of packet and user information by analyzing the packet data per application protocol if the packet data does not satisfy with the predetermined filtering rule; and
   a data storing part for converting the analyzed information by the protocol analyzing part correspondingly to a predetermined standard format and storing the converted information,
   wherein the shared memory is a ring-shaped queue type, wherein the writable blocks of the shared memory are maximized when a ReadStart value is equal to a NextRead value, wherein data are written up to the very right block of the shared memory corresponding to the ReadStart value, and wherein NextRead value increases whenever data are read from the shared memory.

2. The apparatus of claim 1, further comprising a statistics processing part for generating a preliminary billing data using the converted information stored in the data storing part, wherein the preliminary billing data comprises information taken statistics and analyzed on a real-time basis.

3. The apparatus of claim 1, further comprising a packet data re-assembling part for re-assembling fragmented packet data into a logical packet data capable of analyzing by the protocol analyzing part when the packet data is fragmented by a characteristic of protocol.

4. The apparatus of claim 1, wherein the protocol analyzing part comprises a plurality of protocol analyzing parts specialized for the kind of the packet data.

5. The apparatus of claim 1, wherein the packet service apparatus presumes a TCP state of a receiving party to be a SYNRCVD state only after a SYN packet data is transmitted from a transmitting party to the receiving party and an ACK packet data corresponding to the SYN packet data is transmitted from the receiving party to the transmitting party.

6. The apparatus of claim 1, wherein the operating algorithm for the shared memory is a Balanced-Binary-Tree algorithm.

7. A method of controlling whether a packet data received from a transmitting party has to be transmitted to a receiving party in a packet service apparatus of a wire/wireless Internet service system, the method comprising:
receiving a packet data through a network, wherein the packet data comprises at least a source IP address and a destination IP address;
storing the packet data in a shared memory, wherein the shared memory is shared by and accessible from i) a kernel area of an operating system of the packet service apparatus and ii) a user area;
determining whether the packet data satisfies with a predetermined filtering rule;
deleting the packet data if the packet data satisfies with the predetermined filtering rule;
transmitting the packet data correspondingly to the destination IP address if the packet data does not satisfy with the predetermined filtering rule;
generating a preliminary billing data, by analyzing total amount of packet and user information analyzed by analyzing the packet data per application protocol if the packet data does not satisfy with the predetermined filtering rule;
storing a converted information created by converting the preliminary billing data correspondingly to a predetermined standard format; and
transmitting the converted information or the preliminary billing data to a billing apparatus when a transmission request is received from the billing apparatus,
wherein the shared memory is a ring-shaped queue type, wherein the writable blocks of the shared memory are maximized when a ReadStart value is equal to a NextRead value, wherein data are written up to the very right block of the shared memory corresponding to the ReadStart value, and wherein NextRead value increases whenever data are read from the shared memory.

8. The method of claim 7, wherein the packet service apparatus presumes a TCP state of the receiving party to be a SYNRCVD state only after a SYN packet data is transmitted from the transmitting party to the receiving party and an ACK packet data corresponding to the SYN packet data is transmitted from the receiving party to the transmitting party.

9. The method of claim 7, wherein the filtering rule is for determining whether the source IP address or the destination IP address is equal to a pre-stored IP address to be filtered, whether the packet data has errors, whether the packet data is to be used for hacking or cracking, or whether the packet data is infected by a computer virus.

10. The method of claim 7, further comprising re-assembling fragmented packet data into logical packet data capable of analyzing by a protocol analyzing part when the packet data is fragmented by a characteristic of protocol.

11. A computer-readable medium storing a program containing computer-executable instructions for performing a method for controlling whether a packet data received from a transmitting party has to be transmitted to a receiving party in a packet service apparatus of a wire/wireless Internet service system, wherein the method comprises:
receiving packet data through a network, wherein the packet data comprises a source IP address and a destination IP address;
storing the packet data in a shared memory, wherein the shared memory is shared by and accessible from i) a kernel area of an operating system of the packet service apparatus and ii) a user area;
determining whether the packet data satisfies with a predetermined filtering rule;
deleting the packet data if the packet data satisfies with the predetermined filtering rule;
transmitting the packet data correspondingly to the destination IP address if the packet data does not satisfy with the predetermined filtering rule;
generating preliminary billing data by analyzing total amount of packet and user information analyzed by analyzing the packet data per application protocol if the packet data does not satisfy with the predetermined filtering rule;
storing converted information created by converting the preliminary billing data correspondingly to a predetermined standard format; and
transmitting the converted information or the preliminary billing data to a billing apparatus when a transmission request is received from the billing apparatus,
wherein the shared memory is a ring-shaped queue type, wherein the writable blocks of the shared memory are maximized when a ReadStart value is equal to a NextRead value, wherein data are written up to the very right block of the shared memory corresponding to the ReadStart value, and wherein NextRead value increases whenever data are read from the shared memory.

12. An apparatus for controlling whether a packet data received from a transmitting party has to be transmitted to a receiving party in a packet service apparatus of a wire/wireless Internet service system, the apparatus comprising:
means for receiving a packet data through a network, wherein the packet data comprises at least a source IP address and a destination IP address;
means for storing the packet data in a shared memory, wherein the shared memory is shared by and accessible from i) a kernel area of an operating system of the packet service apparatus and ii) a user area;
means for determining whether the packet data satisfies with a predetermined filtering rule;
means for deleting the packet data if the packet data satisfies with the predetermined filtering rule;
means for transmitting the packet data correspondingly to the destination IP address if the packet data does not satisfy with the predetermined filtering rule;
means for generating a preliminary billing data by analyzing total amount of packet and user information analyzed by analyzing the packet data per application protocol if the packet data does not satisfy with the predetermined filtering rule;
means for storing a converted information created by converting the preliminary billing data correspondingly to a predetermined standard format; and
means for transmitting the converted information or the preliminary billing data to a billing apparatus when a transmission request is received from the billing apparatus,
wherein the shared memory is a ring-shaped queue type, wherein the writable blocks of the shared memory are maximized when a ReadStart value is equal to a NextRead value, if the shared memory is a ring-shaped queue type, wherein data are written up to the very right block of the shared memory corresponding to the ReadStart value, and wherein NextRead value increases whenever data are read from the shared memory.

13. A packet service apparatus, comprising:

a packet data input part configured to receive a packet data through a network and store the packet data in a shared memory, wherein the packet data comprises at least a source IP address and a destination IP address, and wherein the shared memory is shared by and accessible from i) a kernel area of an operating system of the packet service apparatus and ii) a user area;

a filtering part configured to determine whether the packet data stored in the shared memory satisfies with a predetermined filtering rule and delete the packet data if the packet data satisfies with the predetermined filtering rule;

a packet output part configured to transmit the packet data correspondingly to the destination IP address if the packet data does not satisfy with the predetermined filtering rule;

a protocol analyzing part configured to analyze total amount of packet and user information by analyzing the packet data per application protocol if the packet data does not satisfy with the predetermined filtering rule; and a data storing part configured to convert the analyzed information by the protocol analyzing part correspondingly to a predetermined standard format and store the converted information, wherein the shared memory is a ring-shaped queue type, wherein the writable blocks of the shared memory are maximized when a ReadStart value is equal to a NextRead value, wherein data are written up to the very right block of the shared memory corresponding to the ReadStart value, and wherein NextRead value increases whenever data are read from the shared memory.

* * * * *